(12) United States Patent
Assier

(10) Patent No.: US 6,712,374 B2
(45) Date of Patent: Mar. 30, 2004

(54) TWO-WHEELED VEHICLE WITH REAR SUSPENSION

(75) Inventor: Denis Assier, Saint Jean Delnous (FR)

(73) Assignee: Promiles, Villeneuve d'Ascq (FR)

( * ) Notice: Subject to any disclaimer, the term of this patent is extended or adjusted under 35 U.S.C. 154(b) by 0 days.

(21) Appl. No.: 10/344,188

(22) PCT Filed: Jul. 16, 2002

(86) PCT No.: PCT/FR02/02534
§ 371 (c)(1),
(2), (4) Date: Feb. 7, 2003

(87) PCT Pub. No.: WO03/010042
PCT Pub. Date: Feb. 6, 2003

(65) Prior Publication Data
US 2003/0160421 A1 Aug. 28, 2003

(30) Foreign Application Priority Data
Jul. 26, 2001 (FR) .............................. 01 10016

(51) Int. Cl.⁷ .............................................. B62K 25/28
(52) U.S. Cl. ....................................................... 280/284
(58) Field of Search ................................ 280/284, 283, 280/288, 259

(56) References Cited

U.S. PATENT DOCUMENTS

| 3,966,006 | A | * | 6/1976 | Cullinan .................... 280/284 |
| 4,596,302 | A | * | 6/1986 | Suzuki et al. ............... 180/227 |
| 4,789,042 | A | * | 12/1988 | Pitts .......................... 180/231 |
| 5,011,459 | A | * | 4/1991 | Van De Vel ................. 474/101 |
| 5,244,224 | A | * | 9/1993 | Busby ......................... 280/284 |
| 5,332,246 | A | * | 7/1994 | Buell .......................... 280/284 |
| 6,099,010 | A | | 8/2000 | Busby |
| 6,203,042 | B1 | | 3/2001 | Wilcox |
| 6,488,301 | B2 | * | 12/2002 | Klassen et al. ............. 280/284 |

FOREIGN PATENT DOCUMENTS

| DE | 19802429 | 8/1999 |
| EP | 0941917 | 9/1999 |
| EP | 1026073 | 8/2000 |
| FR | 2776981 | 10/1999 |
| FR | 2803576 | 7/2001 |
| WO | WO 9856645 | 12/1998 |

\* cited by examiner

Primary Examiner—Avraham Lerner
(74) Attorney, Agent, or Firm—Weingarten, Schurgin, Gagnebin & Lebovici LLP

(57) ABSTRACT

A two-wheeled vehicle, in particular a bicycle or a mountain bike, the vehicle being fitted with a rear suspension and comprising a front frame carrying a bottom bracket and an oscillating rear assembly carrying a driving rear wheel, said frame and said rear assembly being connected to each other via two pivot connections and via a damping system, wherein the first pivot connection is formed by a circular eccentric constituted in a casing carrying an eccentric pin, said casing being mounted to pivot in a housing in the front frame, while the rear assembly is fixed to the eccentric pin on either side of the casing, and wherein the second pivot connection is formed by a connecting rod constituted by a simple plate disposed in the general direction of the frame.

13 Claims, 3 Drawing Sheets

TWO-WHEELED VEHICLE WITH REAR SUSPENSION

The present invention relates to a vehicle of the two-wheeled type, in particular a bicycle or more particularly a mountain bike, fitted with rear suspension.

BACKGROUND OF THE INVENTION

A mountain bike may conventionally comprise two suspensions, a front suspension and a rear suspension. The front suspension generally consists in a telescopic fork. The rear suspension comprises an oscillating assembly and a damping system. The oscillating assembly which supports the rear wheel is connected to the front frame of the bike via one or more pivot connections. The function of the damping system is to suspend the user-supporting frame of the bike elastically while damping shocks due to vertical deflection of the rear wheel. A function of the pivot connection(s) is to guide the vertical movement of said rear wheel that result from irregularities in the terrain.

In a first type of rear suspension, the bottom bracket forms an integral portion of the oscillating assembly so that the suspension has no direct influence on transmission. Regardless of the vertical deflection of the rear wheel, the distance between the bottom bracket and the axis of said wheel remains constant.

In a second type of rear suspension, the bottom bracket is an integral portion of the frame so that the suspension does have an influence on transmission. During vertical deflection of the rear wheel, the distance between the bottom bracket and the axis of the rear wheel varies.

This interaction between the suspension and the transmission can give rise to a so-called "pumping" effect which leads to undesirable displacement of the frame which moves down and up under the effect of energetic pedaling.

Proposals have already been made, in document FR A 2 774 966 for a mountain bike having a rear suspension with two pivot connections and in which the bottom bracket forms an integral portion of the front frame. In that document, the rear suspension is made up of first and second rigid links each connecting the oscillating arm carrying the rear wheel to the front frame, together with a damping system.

Each of the links is preferably made of forged or machined light alloy in the form of two devises connected back to back so as to constitute an H-shape. The cross-bar interconnecting the branches of the H-shape needs to be strongly braced in order to withstand twisting forces adequately without deformation. Two parts of the same type, analogous to the links of document FR 2 774 966 are also to found in document U.S. Pat. No. 5,259,637 under references 60 and 62 and in document FR 2 776 981 under references 7 and 8.

In those examples of known rear suspensions, the links or the like must provide not only the pivot function between the oscillating assembly and the front frame, but they must also provide the mountain bike with strength.

It is also to be observed that the embodiment described in document U.S. Pat. No. 5,259,637 is particularly complex, implementing a very large number of parts connecting the two links indirectly to the damping system which is formed by a compression spring.

OBJECTS AND SUMMARY OF THE INVENTION

The present invention provides a two-wheeled vehicle, in particular a bicycle or indeed a mountain bike, said vehicle being fitted with a rear suspension and comprising a front frame carrying a bottom bracket and an oscillating rear assembly carrying a driving rear wheel, said frame and said rear assembly being connected to each other via two pivot connections and via a damping system. In manner characteristic of the invention, the first pivot connection is formed by a circular eccentric constituted in a casing carrying an eccentric pin, said casing being mounted to pivot in a housing in the front frame, while the rear assembly is fixed to the eccentric pin on either side of the casing; in addition the second pivot connection is formed by a connecting rod constituted by a simple plate disposed in the general direction of the frame.

It is true that proposals have already been made in document EP 0 941 917 to use a circular eccentric disposed in a casing carrying an eccentric pin, however in that document the casing is mounted in a housing in the rear frame and it is the bottom bracket that is mounted on the eccentric pin. In addition, in that case, the second pivot connection is formed by a cam system.

The term "general direction of the frame" is used to mean the deflection direction of the vehicle when the front wheel is exactly in line with the frame. This is thus a direction which corresponds to the midplane of the frame or which is parallel thereto.

Thus, the rigidity of the rear suspension is provided by the circular eccentric and it is the plate forming the connection rod that allows said suspension to move.

The two functions of providing rigidity and of constituting a linkage are thus dissociated to a large extent in the vehicle of the invention.

The circular eccentric preferably presents eccentricity d1 of the order of 15 millimeters (mm) to 20 mm. In comparison, the length d2 of the connecting rod between its two pivots is of the order of 80 mm to 150 mm.

Advantageously, the circular eccentric is housed in the front frame close to the bottom bracket, and in particular above it and behind it.

The portion of the front frame which is designed to receive the bottom bracket and the circular eccentric is preferably a junction piece made as a single machined part, the unfinished part being obtained by forging, molding, or extrusion. This method of implementation presents several advantages: low manufacturing cost, accurate positioning of the circular eccentric and of the bottom bracket, better overall rigidity. When the front frame is of traditional structure, the junction piece is assembled with the seat tube and with the diagonal tube.

The damping system is fixed firstly to the oscillating rear assembly and secondly to the frame. It combines the functions of damping and of providing suspension. It can be a spring, air, or oil system. For simplification purposes, in the specification below, it is referred to by the generic term of "damper". The cylinder of the damper is fixed to the frame and the end of its rod is fixed to the oscillating rear assembly. The damping system acts in a direction which corresponds to the longitudinal axis of the cylinder and the rod of said damper. The damping system preferably acts in a direction that makes a small angle $\alpha$ relative to the portion of the frame to which said system is fixed, where $\alpha$ is advantageously less than 30°, and is preferably about 20°. This particular disposition has the effect of considerably reducing the stresses on and the deformation of the front frame. In particular, it enables the damping system to be fixed to the cross-bar of the frame, assuming that it is a traditional frame having a substantially horizontal cross-bar, a seat tube, and a diagonal tube. Under such circumstances, the angle α corresponds to the angle between the general direction of the cross-bar and the axis of the damping system; when this angle α is less than 30°, there is no need to give additional rigidity to the cross-bar of the frame. Clearly the angle α is caused to vary as the suspension moves through an angle, thereby compressing the damping system, however such variation remains within the limits stated above, i.e. the angle is less than or equal to about 30°.

In a preferred variant embodiment, the damping system, the oscillating rear assembly, and the plate forming a connecting rod are secured to one another about a common pivot pin. This thus provides a common fixing for the connecting rod and for the damping system with the oscillating rear assembly, thereby reducing the number of pivots that need to be made and also the number of assemblies, and thus also achieving a significant saving of weight.

In a preferred embodiment, the damping system acts substantially in line with a rectilinear portion of the oscillating rear assembly having a first end fixed to said damping system and a second end carrying the rear wheel. This particular disposition provides optimum transmission of forces from the rear wheel on the damping system.

The oscillating rear assembly is preferably of a substantially triangular configuration, being formed by a chain-stay rod between the eccentric pin of the eccentric casing and the rear wheel, a seat stay between the rear wheel and the connecting rod pivot, and a reinforcing rod between the connecting rod pivot and the eccentric pin of the eccentric. Increased rigidity is obtained because the triangle is closed. In this configuration, as mentioned above, the damping system preferably acts substantially in line with the seat stay.

BRIEF DESCRIPTION OF THE DRAWINGS

The present invention will be better understood on reading the following description of a preferred embodiment of a mountain bike with a triangular rear suspension, as shown in the accompanying drawings, in which.

MORE DETAILED DESCRIPTION

Figure 1:
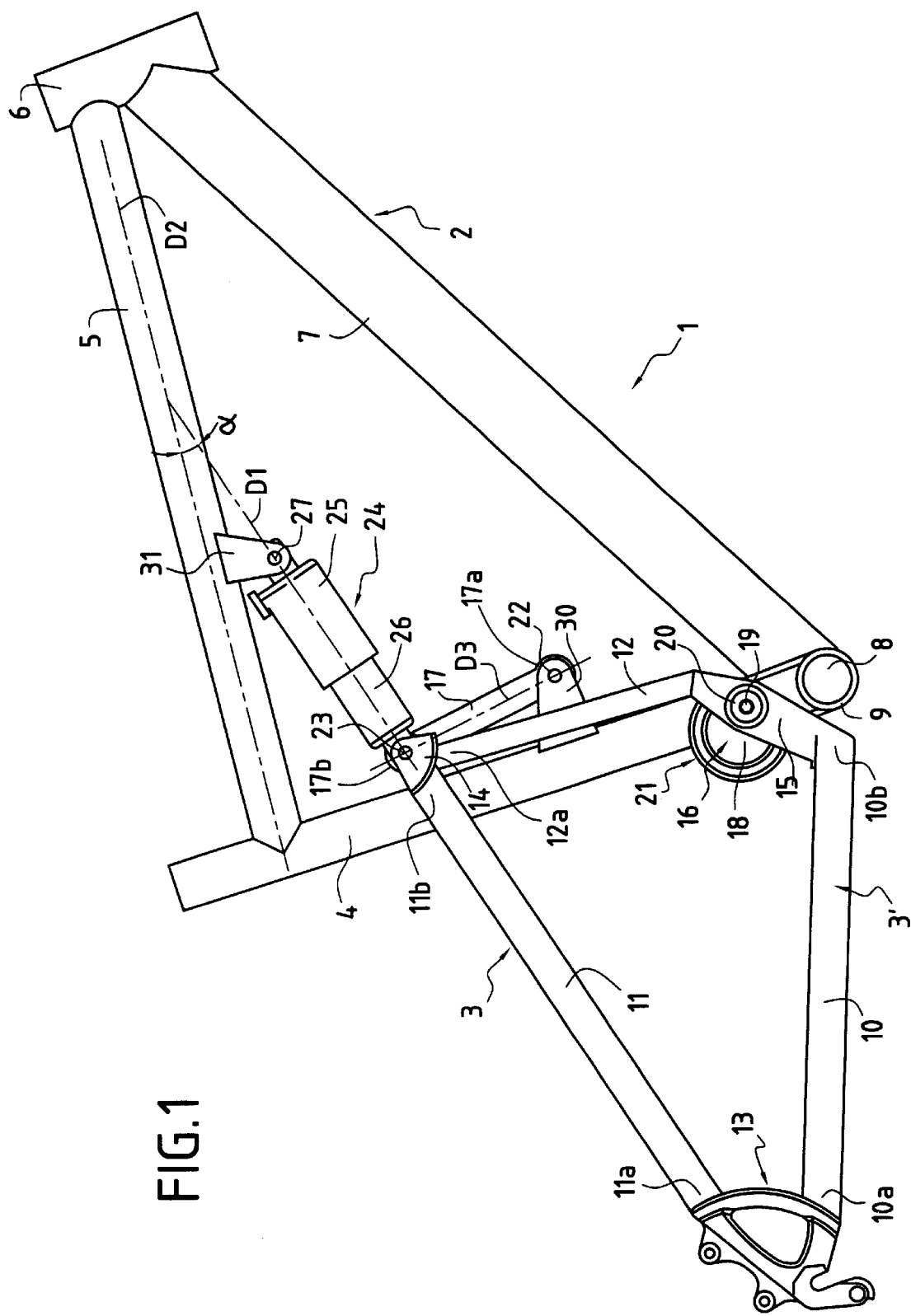
FIG. 1 is a fragmentary view of the mountain bike, showing its front frame and the oscillating rear assembly.

The mountain bike 1 with rear suspension which is shown in part in FIG. 1 comprises a front frame 2 of relatively conventional structure and an oscillating rear assembly 3.

The front frame 2 comprises four tubes, respectively the seat tube 4, the top cross-bar 5, the head tube 6, and the diagonal tube 7. The bottom bracket 8 is mounted in a housing 9 formed at the bottom end of the seat tube where the seat tube 4 intersects the diagonal tube 7.

The oscillating rear assembly 3 carries the driving rear wheel (not shown). It is constituted by two subassemblies 3', one of which is visible in FIG. 1, the subassemblies being disposed on either side of the midplane of the front chassis 2 and being connected to each other in particular via two pivot connections as described below.

Each subassembly 3' is generally triangular in configuration, having a chain-stay tube 10, a seat stay tube 11, and a reinforcing tube 12. The rear portions 10a and 11a respectively of the chain-stay tube 10 and of the seat stay tube 11 are terminated by a connection piece 13 which is used for mounting the rear wheel.

The front portion 11b of the seat stay 11 and the top portion 12a of the reinforcing tube 12 are interconnected by a piece 14 constituting the top vertex of the triangle made up of the three tubes 10, 11, and 12.

The front portion 10b of the chain-stay tube and the bottom portion 12b of the reinforcing tube are connected together by a piece 15 which, in the example shown, does not constitute one of the vertices of the triangle, but instead constitutes a short side of a quadrilateral whose other three sides are formed by the three tubes 10, 11, and 12. Naturally this particular configuration is not exclusive, and the piece 15 could be a connecting piece analogous to the piece 14 between the seat stay 11 and the reinforcing tube 12.

The rear assembly 3 is connected to the front frame 2 via two pivot connections and a damping system. In characteristic manner, the first pivot connection is constituted by a circular eccentric 16 and the second pivot connection is constituted by a connecting rod 17 formed merely by a plate lying in the midplane of the front frame 2 or parallel thereto.

More precisely, the circular eccentric 16 comprises a casing that is free to turn about an axis 28 perpendicular to the midplane of the frame 2, and that carries an eccentric pin 19. The eccentric pin 19 that is carried by the casing 18 projects beyond the frame 2 on either side and is secured to the rear assembly 3 by a pivot connection 20.

In the example shown, the circular eccentric 16 is mounted in a housing 21 formed in the seat tube 4 close to the housing 9 containing the bottom bracket 8. The housing 21 for the circular eccentric 16 and the housing 9 for the bottom bracket 8 are preferably integrated in a unitary junction piece 30 machined from a single unfinished part obtained by forging, molding, or extrusion.

This unitary junction piece 30 is welded to the seat tube 10 and to the diagonal tube 7.

The pivot connection 20 between the eccentric pin 19 and the rear assembly 3 is provided via the piece 15 between the chain-stay tube 10 and the reinforcing tube 12.

Figure 5:
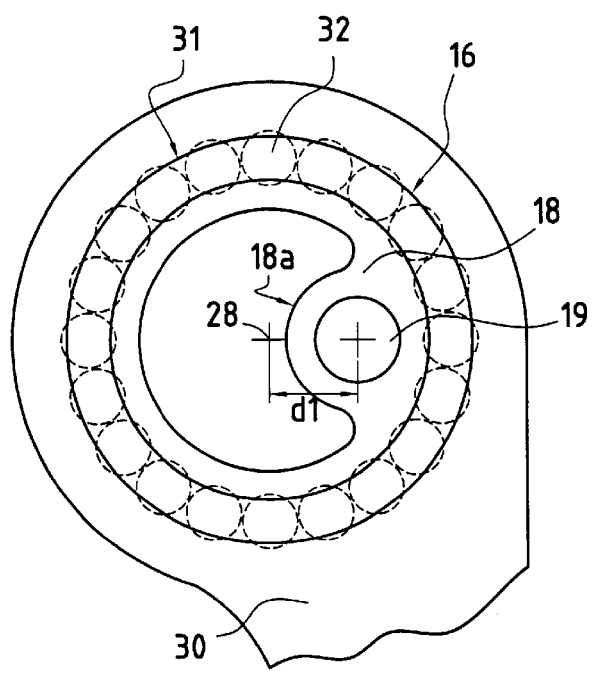
FIG. 5 is a fragmentary section view of the unitary junction piece in the vicinity of the circular eccentric.

FIG. 5 shows this unitary junction piece 30 in greater detail, said piece presenting a cylindrical recess serving as the housing 31 for the circular eccentric 16. The eccentric is essentially constituted by the casing 18 which is mounted to pivot about the axis 28 of the eccentric 16 in conventional manner as represented in FIG. 5 by a peripheral ball bearing 32. The casing 18 is of annular configuration with a projection 18a that is partially hollowed out to receive the eccentric pin 19. The pin 19 is itself connected via a pivot connection to the rear assembly 3. This annular configuration provides a saving in weight compared with a solid housing.

The connecting rod 17 connects the front frame 2 to the rear assembly 3 via two pivot connections 22 and 23. More precisely, the connecting rod 17 is fixed to the seat tube 4 via a fork 30 with a first pivot connection 22 and the bottom end 17a of the connecting rod 17 being disposed between the two tines of the fork. The second pivot connection 23 is level with the pieces 14 of the two triangular subassemblies 3' constituting the rear assembly 3, the top end 17b of the connecting rod 17 being mounted between said two pieces 14 by means of a ball-and-socket connection 23.

The damping system is constituted by a damper 24 whose cylinder 25 is fixed to the front frame 2 via a pivot connection 27, and whose rod 26 is fixed to the rear assembly 3 via another pivot connection. In the example shown, the rod 26 of the damper 24 is fixed to the same pivot connection 23 as the top end 17b of the connecting rod where it is connected to the rear assembly 3. Like the connecting rod 17, the cylinder 25 is fixed to the cross-bar 5 via a fork 31 and a pivot connection 27.

In this embodiment, the plane of the connecting rod 17 is slightly offset from the midplane of the front frame 2.

Figure 2:
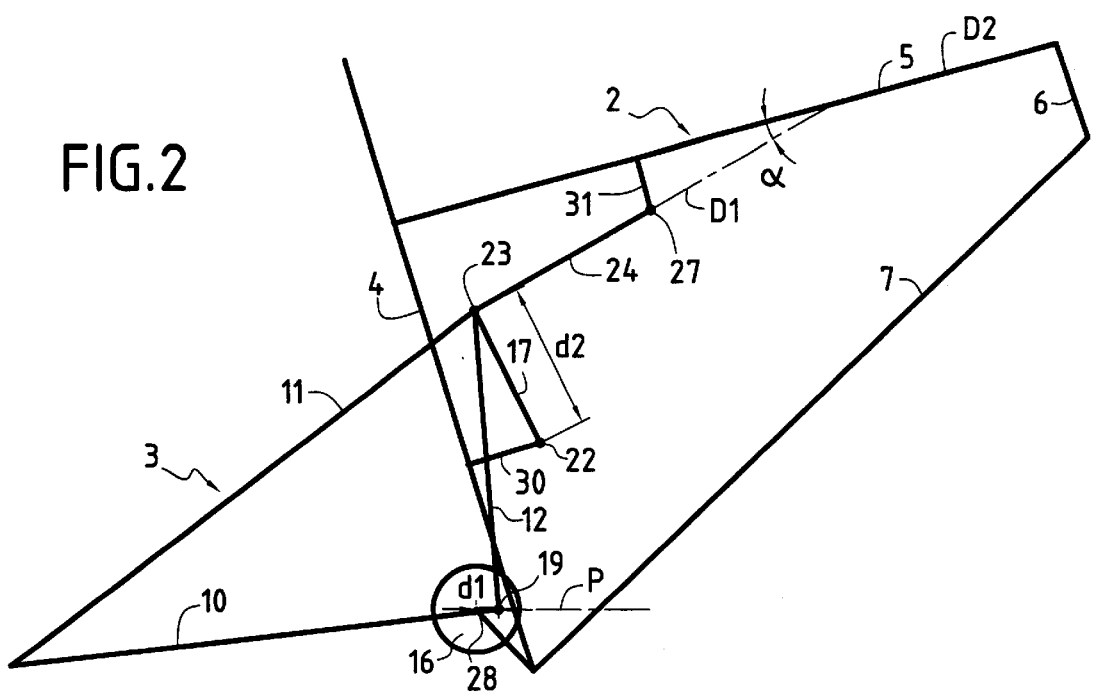
FIG. 2 is a diagram representing the bike of FIG. 1 in its unloaded static state.

In conventional manner, as with any rear suspension, the deflection of the rear wheel is limited by the stroke of the damper system 24. In the static position, i.e. when the mountain bike is at rest without any additional load, the rod 26 is extended to the maximum extent from the cylinder. In this disposition, as shown in FIG. 2, the rod 26 of the damper 24 acts in a direction D1 which is substantially in line with the seat stay 11 of the rear assembly 3. In addition, the angle α between said direction D1 and the axis of symmetry D2 of the cross-bar 5 is less than 30°, and is preferably less than or equal to about 20°.

Furthermore, the rod 26 of the damper 24 acts in a direction D1 which is substantially perpendicular to the axis D3 of the connecting rod 17, i.e. the axis passing through the two ball-and-socket connections 22 and 23.

While the bike is in its unloaded static state, i.e. completely at rest, the plane P containing the axis of rotation 28 of the casing 18 of the circular eccentric 16 and the eccentric pin 19 is a substantially horizontal plane, extending parallel to the plane containing the axes of the front and rear wheels of the bike.

The eccentricity, i.e. the distance d1 between the axis of rotation 28 of the casing 18 of the eccentric 16 and the eccentric pin 19 preferably lies in the range 15 mm to 20 mm, and in a preferred embodiment it is about 17 mm. Under such circumstances, the distance d2 between the two ball-and-socket connections 22 and 23 of the connecting rod 17 is about 120 mm.

Figure 3:
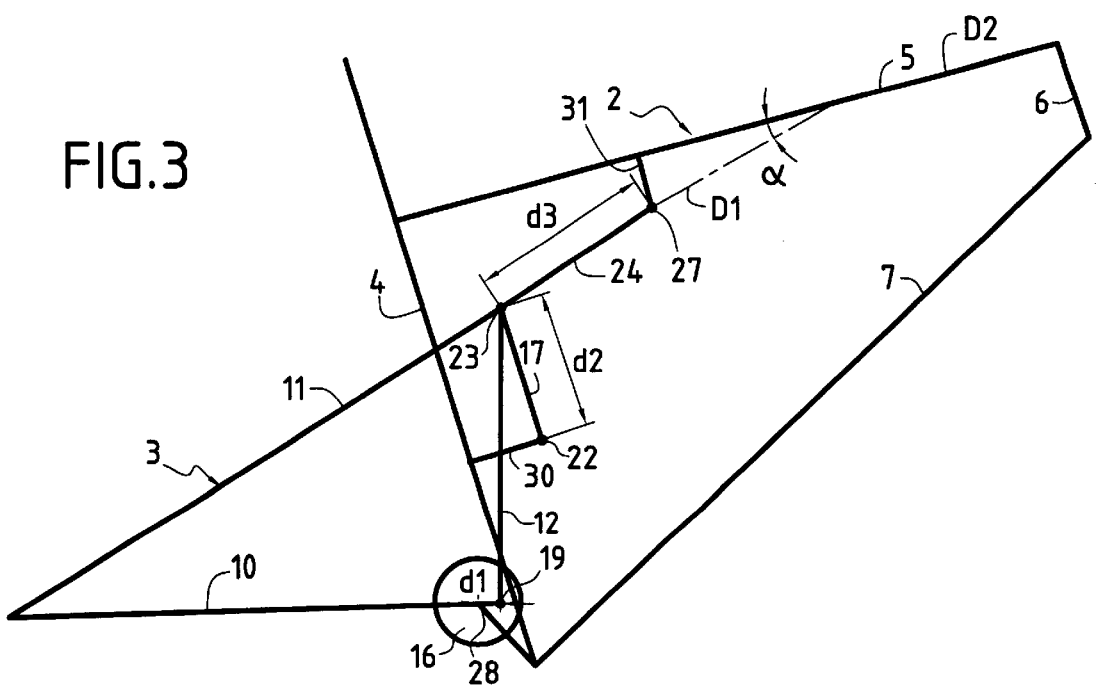
FIG. 3 is a diagram representing the bike of FIG. 1 in its loaded static state.

When the bike is in a loaded static state (FIG. 3) carrying the weight of an average user, the damper 24 is shortened by about 10%. In other words, the distance d3 between the two ball-and-socket connections 23 and 27 is about 10% shorter than when the bike is in the unloaded static state. Because of this displacement of the rod 26 into the cylinder 25, the rear assembly has deflected in corresponding manner by pivoting both of the eccentric pin 19 and of the connecting rod 17, thereby also causing the angle α to vary. In practice, this configuration corresponds to the bike being used on flat ground without bumps or irregularities, and without jolts in the pedaling.

Figure 4:
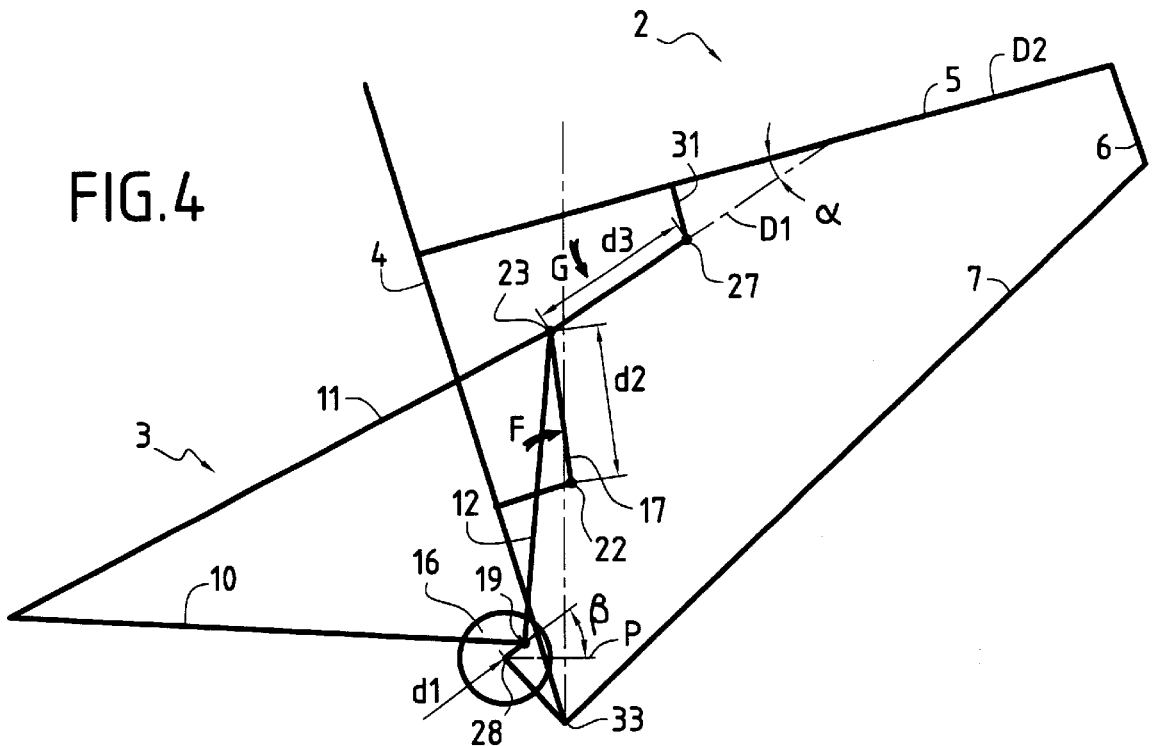
FIG. 4 is a diagram of the bike of FIG. 1 in its state of maximum deflection.

The third configuration which is shown in FIG. 4 corresponds to the maximum deflection state where the rod 26 is maximally engaged in the cylinder 25 of the damper 24. By way of example, the maximum stroke of the rod 26 can be about 35 mm to 40 mm. In this configuration, the eccentric pin 19 has moved about the axis of rotation 28 of the casing 18 through an angle β of about 45° away from its initial position (FIG. 2); the ball-and-socket connection 23 at the piece 14 is moved away from the seat tube 4 by the connecting rod 17 turning in the direction of arrow F, thereby causing the damper 24 to pivot in the direction of arrow G so that the angle α is increased somewhat while remaining of relatively small value, less than 30°. This angular variation in the angle α can be of the order of 5°. It is therefore appropriate when designing the structural conditions of the bike to select an initial angle α in the unloaded static state that is equal to or less than about 25° so as to obtain the desired technical effect of minimizing stresses on and deformation of the cross-bar 5 when the damper 24 is damping angular deflection of the rear assembly 3.

It would indeed be possible to place the damper at some other location on the front frame 2, in particular it could be fixed to the diagonal tube 7. However that solution would not make it possible to minimize stresses and deformation of the frame, as described above. In addition it would present the drawback of making the diagonal tube unavailable for receiving a water bottle clip in conventional manner.

It would also be possible to fix the damper system not via the pivot connection 23 of the connecting rod 17 but via some other location of the rear assembly 3. Nevertheless, the solution described and shown makes it possible to reduce the number of pivots that need to be made and the number of assemblies that are required, thereby achieving a significant saving in weight and minimizing the number of fasteners.

Because of the configuration comprising the circular eccentric 16 whose eccentric pin 19 carries the two lateral subassemblies 3' of the rear assembly 3, a structure is obtained that is very rigid, particularly since the eccentricity d1 of the circular eccentric 16 is relatively small. This rigidity is further increased by the presence of the reinforcing rods 12 which close the rear assembly 3.

During vertical deflection of the rear wheel, the damper 24 acts in a direction D1 that remains substantially perpendicular to the axis D3 of the connecting rod 17 and does not depart by more than ±30° from being perpendicular to the axis D3. The stresses induced by the damper 24 on the connecting rod 17 are therefore small in comparison with a solution in which the angle between the directions D1 and D3 is small.

The connecting rod 17 contributes little to the rigidity of the bike. It can be implemented very simply, being constituted merely by a plate serving to provide the linkage function for the rear suspension. It could be an aluminum plate, but in order to save weight or for marketing reasons, it could be a plate of some higher grade material such as titanium or carbon, and this can be done without significantly increasing the cost of the bike because the structure of this part is particularly simple.

It has been found that the optimum efficiency for the bike without any pumping effect is obtained with the following dispositions that are preferably taken in combination:
  the plane P containing the axis of rotation 28 of the eccentric casing 18 and the eccentric pin 19 is substantially horizontal when the bike is in its static position;
  the axis of the pivot connection 22 between the connecting rod 17 and the front frame 2 lies substantially in the vertical plane P' containing the bottom bracket axle 33, or slightly in front of said plane P'; and
  the mean direction of the connecting rod 17 (between the unloaded static state and the maximum displacement state) is substantially parallel to the seat axis D4.

The seat axis D4 corresponds to the general direction of the seat tube 4, it being understood that the front frame 2 may be of non-conventional structure without a seat tube proper, i.e. without a tube that fully connects the seat rod to the bottom bracket.

What is claimed is:
1. A two-wheeled vehicle, the vehicle being fitted with a rear suspension and comprising a front frame carrying a bottom bracket and an oscillating rear assembly carrying a driving rear wheel, said frame and said rear assembly being connected to each other via two pivot connections and via a damping system, wherein the first pivot connection is formed by a circular eccentric constituted in a casing carrying an eccentric pin, said casing being mounted to pivot in a housing in the front frame, while the rear assembly is fixed to the eccentric pin on either side of the casing, and wherein the second pivot connection is formed by a connecting rod constituted by a simple plate disposed in the general direction of the frame.

2. A vehicle according to claim 1, wherein the circular eccentric presents eccentricity of about 15 mm to 20 mm.

3. A vehicle according to claim 1, wherein the length of the connecting rod between its two pivots is about 80 mm to 150 mm.

4. A vehicle according to claim 1, wherein the circular eccentric is housed in the front frame close to the bottom bracket.

5. A vehicle according to claim 1, wherein the portion of the front frame for receiving the bottom bracket and the circular eccentric is a unitary junction piece which is obtained in the unfinished state by forging, molding, or extrusion.

6. A vehicle according to claim 1, wherein the direction D1 in which the damping system acts makes a small angle $\alpha$ with the portion of the frame to which said system is fixed.

7. A vehicle according to claim 1, wherein the damping system, the oscillating rear assembly, and the plate forming the connecting rod are secured to one another about a common pivot axis.

8. A vehicle according to claim 1, wherein the direction D1 in which the damping system acts is substantially in line with a rectilinear portion of the oscillating rear assembly having a first end fixed to said damping system and a second end carrying the rear wheel.

9. A vehicle according to claim 1, wherein the oscillating rear assembly is of a configuration that is substantially triangular, being formed by a chain-stay rod between the eccentric pin carried by the casing of the eccentric and the rear wheel, a seat stay between the rear wheel and a pivot of the connecting rod, and a reinforcing rod between said pivot of the connecting rod and said eccentric pin.

10. A vehicle according to claim 1, comprising at least one of the following dispositions:

the plane P containing the axis of rotation of the casing of the eccentric and the eccentric pin is substantially horizontal when the vehicle is in its static position;

the axis of the pivot connection between the connecting rod and the front frame lies substantially in the vertical plane P' containing the bottom bracket axle or slightly in front of said plane P'; and the mean direction of the connecting rod between its unloaded static state and its maximally loaded state is substantially parallel to the seat axis D4.

11. A vehicle according to claim 4, wherein the circular eccentric is housed above and behind the bottom bracket.

12. A vehicle according to claim 6, wherein $\alpha$ is less than 30°.

13. A vehicle according to claim 6, wherein $\alpha$ is about 20°.

* * * * *

UNITED STATES PATENT AND TRADEMARK OFFICE
CERTIFICATE OF CORRECTION

PATENT NO. : 6,712,374 B2  Page 1 of 1
DATED : March 30, 2004
INVENTOR(S) : Denis Assier It is certified that error appears in the above-identified patent and that said Letters Patent is hereby corrected as shown below:

Column 1,
Line 45, "devises" should read -- clevises --.

Signed and Sealed this

Twenty-eighth Day of December, 2004

JON W. DUDAS
*Director of the United States Patent and Trademark Office*